United States Patent Office 2,780,578
Patented Feb. 5, 1957

2,780,578

PRODUCTION OF RESERPIN HYPOTENSIVE PREPARATION

Bernard Rubin, Metuchen, N. J., assignor to Olin Mathieson Chemical Corporation, New York, N. Y., a corporation of Virginia No Drawing. Application September 10, 1953, Serial No. 379,460

6 Claims. (Cl. 167—84.5)

This invention relates to the production of hypotensive preparations from the plant *Rauwolfia serpentina*.

*Rauwolfia serpentina*, in the form of the powdered whole root, has long been used as a drug for its sedative effect. Recently, it has come into prominence as a hypotensive agent, by virtue of its mild action and gradual lowering of blood pressure. The drug may be administered orally in tablet form and the beneficial results usually persist long after treatment is stopped.

Although the component (reserpin) believed to be primarily responsible for this beneficial action has been isolated from *Rauwolfia serpentina* in pure crystalline form, there is no indication that this single component is superior to the whole root or reserpin concentrates thereof for the treatment of hypertension. Accordingly, it is essential for therapeutic utilization of the drug that it be of biologically-determined activity. However, the hypotensive response of the dog (or other test animals with determinable blood pressure) is very slow in onset and of long duration, and the slope of the dose response curve is very low; hence the direct measurement of hypotension is not suitable as a basis for assay.

It is the object of this invention to provide a sensitive and reliable biological assay for determining the reserpin (and reserpin-like) content of hypotensive preparations from *Rauwolfia serpentina*.

In the practice of this invention, the hypotensive preparation (*Rauwolfia serpentina* crude root or a reserpin concentrate thereof, e. g. a concentrate produced by alkalinizing the powdered whole root with aqueous ammonia, extracting with ethylene dichloride, dissolving the extract after removal of the ethylene dichloride in chloroform, extracting with dilute acetic acid, and removing the chloroform; a procedure as described in the application of Wintersteiner and Diassi Serial No. 379,464, filed of even date herewith) is assayed by systemically dosing separate groups of the same mammalian laboratory test animal with the preparation and with a reference standard reserpin preparation, and determining the relative ptotic response of the two groups. These responses are graded and the results statistically evaluated in the conventional manner; the thus-biologically-assayed preparation may be rejected or accepted on the basis of the assay, or a composition of desired activity may be prepared from the biologically-assayed preparation in accordance with the assay results.

It has been found that there is a close correlation between the relative doses of hypotensive preparations from *Rauwolfia serpentina* necessary to cause such response (e. g. ptosis in the mouse), and the doses of these preparations required to produce the various other pharmacodynamic actions (particularly hypotension in the dog). Hence, such response, particularly the ptotic in the mouse which lends itself to statistical evaluation, may be used as the basis for a reliable biological assay of the reserpin (and reserpin-like) content of hypotensive preparations of *Rauwolfia serpentina*.

Although the mouse (e. g. the albino mouse) is the test animal of choice for the biological assay of this invention (because many applications are required to rule out errors, this test animal is relatively inexpensive, and the ptotic response of the mouse is sufficiently great to permit grading the degree of eyelid drop), satisfactory assays can be carried out in other mammalian laboratory test animals, such as the rat, guinea pig, dog, cat and rabbit.

The systemic dosing of the test animal may be by parenteral or oral administration, preferably the latter. Desirably, at least two groups of the animals are dosed at different dose levels of the test sample and the same number of groups of other test animals of the same type dosed at different dose levels of the standard.

The following example is illustrative of the biological assay of this invention: Two groups of albino mice are separately dosed by oral administration with (A) different dose levels of powdered whole root of *Rauwolfia serpentina*; and two other groups of albino mice are similarly separately dosed with (B) different dose levels of crystalline reserpin. Several hours afterwards (e. g., five hours) the degree of eyelid drop or shortening of the vertical distance between the palpebral margins of the eyelids is scored for each eye in each mouse. The scoring may be quantal at any level of ptotic response and the appropriate statistical procedures applied; but preferably the scoring is graded, e. g. 0, 1, 2, 3 or 4 per eye: 0 representing no visible effect; 1 representing approximately ¼ reduction in the vertical distance; 2 an about ½ reduction; 3 an about ¾ reduction; and 4 a complete closure of the eyelids. The actual test score utilized in the statistical evaluation of the assay is the total score per mouse (sum of the scores of the two eyes), the test-graded ptotic response per mouse thus ranging from 0 to 8. The statistical analysis of the data (potency and limits of error) is conducted according to any of the conventional procedures.

Representative assay results, using reserpin as the reference standard equal to 1.00 are shown in Table 1.

Table 1

| Type of Sample | Sample No. | Relative Potency | Potency Range at 95% Confidence Level |
|---|---|---|---|
| Powdered whole root | I | 0.00104 | 0.00086–0.00125 |
|  | II | 0.00134 | 0.00109–0.00165 |
| Chemical fractions of whole root (in order of concentration of reserpin) | III | 0.00345 | 0.00286–0.00416 |
|  | IV | 0.04025 | 0.03220–0.05031 |
|  | V | 0.1257 | 0.1087–0.1453 |

The mouse ptosis assay described herein has been found to have an inherent efficiency (or $\lambda$ value) ranging from about 0.2 to 0.3. To reach the equivalent of limits of error of 80 to 125% or better at the 95% confidence level, the design of the assay should be as follows: 160 mice per assay; a 2 x 2 factorially designed assay with 40 mice per dose, and a dose interval of 2.0. The precision of the mouse ptosis assay of this invention is indicated in Table 2.

Table 2

| Assay | True Potency | Calculated Potency | (Potency Range) | Deviation from True Potency (%) |
|---|---|---|---|---|
| Whole root I vs. itself (same dilutions) | 1.00 | 1.05 | 0.88–1.27 | 5.0 |
| IV vs. itself at 0.8 dilution | 0.80 | 0.86 | 0.75–0.99 | 7.5 |
| Reserpin vs. itself at 0.8 dilution | 0.80 | 0.90 | 0.78–1.05 | 12.5 |

I claim:

1. In the process of producing a reserpin-containing hypotensive preparation of biologically-determined activity from *Rauwolfia serpentina,* assaying the reserpin-containing preparation by systemic dosing of separate groups of mice with the preparation and with a reference standard reserpin preparation, and determining the relative ptotic response of the two groups.

2. The process of claim 1, in which the ptotic response is graded in order to allow its statictical evaluation.

3. The process of claim 1, in which the preparation assayed is *Rauwolfia serpentina* crude root.

4. The process of claim 1, in which the preparation assayed is a reserpin concentrate of *Rauwolfia serpentina.*

5. The process of claim 1, in which the animal dosing is oral.

6. The process of claim 1, in which at least two groups of mice are dosed at different dose levels of the preparation to be assayed and the same number of groups of other mice are dosed at different dose levels of the reference standard.

References Cited in the file of this patent

UNITED STATES PATENTS 2,461,278 Holaday _____ Feb. 8, 1949

OTHER REFERENCES

Bein Experentia, vol. 9, 1953, pp. 107–110.

Plummer et al.: Article in Annals of the N. Y. Academy of Sciences, Pub. Apr. 30, 1954, vol. 59, Article 1, pp. 8–21.

Chemical Abstracts, vol. 36, 1942, page 6242, vol. 37, 1943, p. 2819, vol. 38, 1944, p. 5003, vol. 40, 1946, p. 4148.

Gupta et al.: J. A. P. A., Sci. Ed., 1947, page 416.

Mukhejee: Nature, Nov. 7, 1953, page 867.